US007862054B2

(12) United States Patent
Fiore, Jr.

(10) Patent No.: US 7,862,054 B2
(45) Date of Patent: Jan. 4, 2011

(54) SPLIT OCCUPANT RETENTION STRUCTURE FOR STROLLERS

(75) Inventor: Joseph F. Fiore, Jr., Lebanon, PA (US)

(73) Assignee: Wonderland Nurserygoods Co., Ltd, Taipei (TW)

(*) Notice: Subject to any disclaimer, the term of this patent is extended or adjusted under 35 U.S.C. 154(b) by 68 days.

(21) Appl. No.: 11/747,882

(22) Filed: May 11, 2007

(65) Prior Publication Data

US 2007/0262543 A1 Nov. 15, 2007

Related U.S. Application Data

(60) Provisional application No. 60/800,572, filed on May 15, 2006.

(51) Int. Cl.
*B62B 9/00* (2006.01)

(52) U.S. Cl. ............ 280/47.38; 280/647; 280/657; 280/658

(58) Field of Classification Search ......... 280/642, 280/647, 650, 657, 658, 47.25, 47.38; 297/467, 297/469

See application file for complete search history.

(56) References Cited

U.S. PATENT DOCUMENTS

| 2,664,150 | A | * | 12/1953 | Byrne | 297/466 |
|---|---|---|---|---|---|
| 2,858,882 | A | * | 11/1958 | Personett | 297/467 |
| 4,856,809 | A | * | 8/1989 | Kohus et al. | 280/644 |
| 5,137,334 | A | * | 8/1992 | Cheney et al. | 297/467 |
| 5,299,824 | A | * | 4/1994 | Roberts et al. | 280/304.1 |
| 5,984,791 | A | * | 11/1999 | Fair et al. | 472/118 |
| 6,024,412 | A | * | 2/2000 | Kain et al. | 297/467 |
| 6,033,019 | A | * | 3/2000 | Hession-Kunz et al. | 297/250.1 |
| 6,155,579 | A | * | 12/2000 | Eyman et al. | 280/30 |
| 6,585,284 | B2 | * | 7/2003 | Sweeney et al. | 280/650 |
| 6,832,813 | B2 | * | 12/2004 | Tomas et al. | 297/250.1 |
| 2002/0005628 | A1 | * | 1/2002 | Hartenstine et al. | 280/647 |

\* cited by examiner

*Primary Examiner*—J. Allen Shriver, II
*Assistant Examiner*—Katy Meyer
(74) *Attorney, Agent, or Firm*—Miller Law Group, PLLC (57) ABSTRACT

An occupant retention structure for a child's stroller utilizes an abbreviated upper horn extending downwardly from the underside of the tray and an abbreviated lower horn that extends upwardly from the seat pan beneath the lower horn without connection therebetween. Other protuberances formed by the tray and seat structures cooperates with the upper and lower horns to prevent the passage of a small probe used to determine if a child's torso or head could pass through an opening. The tray is mounted on a forwardly extending mounting pin for rotation thereon, while being rotatable about an axis of rotation perpendicular to the mounting pin to provide a swivel connection for the tray on one of the arm rests. A spring-loaded detent allows the tray to be released from the mounting pin for removal thereof from the stroller. The opposing end of the tray is latched to the other arm rest.

15 Claims, 7 Drawing Sheets

SPLIT OCCUPANT RETENTION STRUCTURE FOR STROLLERS

CROSS-REFERENCE TO RELATED APPLICATIONS

This application claims priority on U.S. Provisional Patent Application Ser. No. 60/800,572, filed on May 15, 2006, the content of which is incorporated herein by reference.

FIELD OF THE INVENTION

The present invention relates generally to a stroller for use in transporting young children, and, more particularly, to a retention structure between the seat and tray assemblies that will restrict passage of the child between the seat and the tray while facilitating the folding of the stroller into a storage configuration.

BACKGROUND OF THE INVENTION

Strollers for transporting young children are commercially available in many styles and configurations. Strollers are normally configurable in an operative position in which the child is placed on a seat forming part of the stroller to be transported from one place to another by a caregiver pushing the stroller manually, and in a compact storage configuration in which the stroller is folded into a position in which the frame is collapsed and is unusable for the normal function of transporting young children until the stroller is returned to the operative position. These strollers can be folded from the operative configuration into the storage configuration in a number of different ways to achieve a storable size for the stroller frame.

On many current children's products provided with both seat and tray structures, a child positioned on the seat can submarine or slide beneath the tray between the seat and tray components. This ability to slide between the seat and tray can be a problem if the child cannot fully slide through this opening. Two solutions to this problem currently commercially available on such children's products, including strollers, is to either provide an opening between the seat and tray components that is large enough to allow the child's body and head to pass completely through the opening between the seat and the tray, or to create a vertical divider which spans from the tray bottom to the seat surface to prevent the child's body from entering the opening. The divider in this second solution would be wide enough to block the occupant's torso from even passing into, let alone through, the opening between the seat and tray. By blocking both the torso and head from passing through the opening between the seat and tray structures, the submarining of the child occupant is avoided.

A significant problem with the provision of a vertical divider between the seat and tray structures is that the folding of a product such as a stroller between the expanded operative configuration and the folded storage configuration is difficult to attain as the divider structure must be accommodated in the folding geometry. Accordingly, it would be desirable to provide an occupant retention structure that would prevent the passage of the child occupant of a stroller between the seat and tray structures without providing a vertical barrier that which spans from the tray bottom to the seat surface to facilitate the compact folding of the stroller into the storage configuration.

Current rear axles and associated braking mechanism used on commercially available strollers are typically composed of numerous cross bars, links and various components to interconnect the brake actuators on opposing sides of the stroller rear axle to allow the actuation of brakes on the rear wheels on both sides of the stroller, even though only one actuator has been manipulated. These cross bars, links and other components provided to attain simultaneous activation of both rear wheel brakes can complicate construction, be detrimental to the stroller aesthetics, increase the weight of a stroller and, therefore, increase cost of manufacturing the stroller.

Accordingly, it would be desirable to provide a brake actuation apparatus that would be operable to actuate both rear wheel brakes simultaneously even though only one brake actuation lever is manipulated without providing additional cross bars, links and other related components.

The tray structure for a child's stroller is typically designed to be detachable from the stroller at one end, while mounted for rotation about the opposing end of the stroller so that the tray is not completely removable from the stroller. In such configurations, the tray can be completely removed from the stroller if the tray is disassembled, usually requiring additional tools to successfully remove the tray from the stroller. Accordingly, it would be desirable to provide a tray apparatus for a stroller in which the tray was completely removable from the stroller arm rests while providing improved pivotal movement of the tray about one of the arm rests to enhance accessibility to the seat structure of the stroller.

SUMMARY OF THE INVENTION

It is an object of this invention to overcome the disadvantages of the prior art by providing a split occupant retention structure for a stroller that prevents the torso or head of the child occupant from passing between the seat and the tray.

It is another object of this invention to provide an occupant retention structure that does not incorporate a vertical barrier that passes completely between the underside of the tray and the upper side of the seat.

It is a feature of this invention that the split occupant retention structure is constructed with an abbreviated upper horn formed on the underside of the tray structure and an abbreviated lower horn formed into the seat pan structure beneath the upper horn.

It is another feature of this invention that the upper and lower horns are not connected.

It is an advantage of this invention that the upper and lower horns allow the tray structure to move relative to the seat structure when the stroller frame is pivoted to configure the stroller between the expanded operative position and the folded storage position.

It is still another feature of this invention that the stroller seat and tray structures provide additional protuberances that prevent a small test probe from passing through the opening on either side of the abbreviated horns, which openings are used for the positioning of the child occupant's legs.

It is another advantage of this invention that the stroller geometry provides an easy and convenient conversion of the stroller from between the expanded operative configuration and the collapsed storage configuration.

It is still another object of this invention to overcome the disadvantages of the prior art by providing a stroller brake actuation mechanism that does not utilize cross bars, links or other related components to interconnect the transversely spaced brake actuation levers.

It is still another feature of this invention that the rear axle is formed with actuation wings that are engaged by the brake actuation levers.

It is yet another feature of this invention that the rear axle is used to transmit actuation motion from one brake actuation lever to the opposing brake actuation lever.

It is still another advantage of this invention that both of the rear wheel brakes are actuated simultaneously by the manipulation of only one of the transversely spaced brake actuation levers.

It is a further feature of this invention that the rear wheels are rotatably mounted on the rear axle for independent rotation.

It is yet another advantage of this invention to reduce brake actuator complexity, reduce weight and reduce cost of manufacture of strollers.

It is yet another object of this invention to overcome the disadvantages of the prior art by providing a removable tray for a stroller that has a swivel mounting on one arm rest.

It is still a further feature of this invention that the stroller tray is mounted for rotational movement about two orthogonal axes to establish a swivel connection of one end of the tray to the corresponding arm rest.

It is yet a further feature of this invention that the stroller tray is detachable from a mounting pin defining one of the axes of rotation through release of a spring-loaded detent to permit the tray to be completely removed from the stroller.

It is a further advantage of this invention that the positioning of the stroller tray has increased flexibility in operation.

It is still a further advantage of this invention that the stroller tray can be easily and conveniently removed from the stroller.

It is a further object of this invention to provide an occupant retention structure for a stroller, which is durable in construction, inexpensive of manufacture, carefree of maintenance, facile in assemblage, and simple and effective in use.

It is still a further object of this invention to provide a stroller brake actuation apparatus which is durable in construction, inexpensive of manufacture, carefree of maintenance, facile in assemblage, and simple and effective in use.

It is yet a further object of this invention to provide a mounting for a stroller tray which is durable in construction, inexpensive of manufacture, carefree of maintenance, facile in assemblage, and simple and effective in use.

These and other objects, features and advantages are accomplished according to the instant invention by providing an occupant retention structure for a child's stroller that utilizes an abbreviated upper horn extending downwardly from the underside of the tray and an abbreviated lower horn that extends upwardly from the seat pan beneath the lower horn without connection therebetween. Other protuberances formed by the tray and seat structures cooperates with the upper and lower horns to prevent the passage of a small probe used to determine if a child's torso or head could pass through an opening. The tray is mounted on a forwardly extending mounting pin for rotation thereon, while being rotatable about an axis of rotation perpendicular to the mounting pin to provide a swivel connection for the tray on one of the arm rests. A spring-loaded detent allows the tray to be released from the mounting pin for removal thereof from the stroller. The opposing end of the tray is latched to the other arm rest.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring now to FIGS. 1-4, a stroller incorporating the principles of the instant invention can best be seen. The stroller 10 includes a wheeled frame 12 that is supported on front and rear ground-engaging wheels 18, 19 that permit mobile movement of the stroller 10 over the surface of the ground to transport children. The frame 12 includes a pair of transversely spaced front legs 13 on which the front wheels 18 are mounted and a corresponding pair of transversely spaced rear legs 14 on which the rear wheels 19 are mounted. The frame also includes a pair of upwardly extending, transversely spaced handle tubes 15 terminating in a handle bar 16 defining a preferred generally inverted U-shaped configuration. A generally horizontally oriented seat assembly 20 and an arm rest and tray assembly 30 are supported on the front and rear legs 13, 14 and the handle tubes 15.

The front and rear legs 13, 14 are pivotally connected to the arm rest assembly 30. The seat assembly 20 is pivotally connected to the front legs 13 and to the handle tubes 15. Preferably, the handle tubes 15 are articulated with a pair of stabilizer members 17 that establish a pivoting frame structure 12 for the stroller 10 that is convertible between an expanded operative configuration, depicted in FIG. 1, and a collapsed, folded storage configuration that is better shown and described in co-pending U.S. patent application Ser. No. 11/747,815, filed contemporaneously herewith, and entitled "Stroller with Spring-Assisted Fold Mechanism", the contents of which are incorporated herein by reference.

Figure 1:
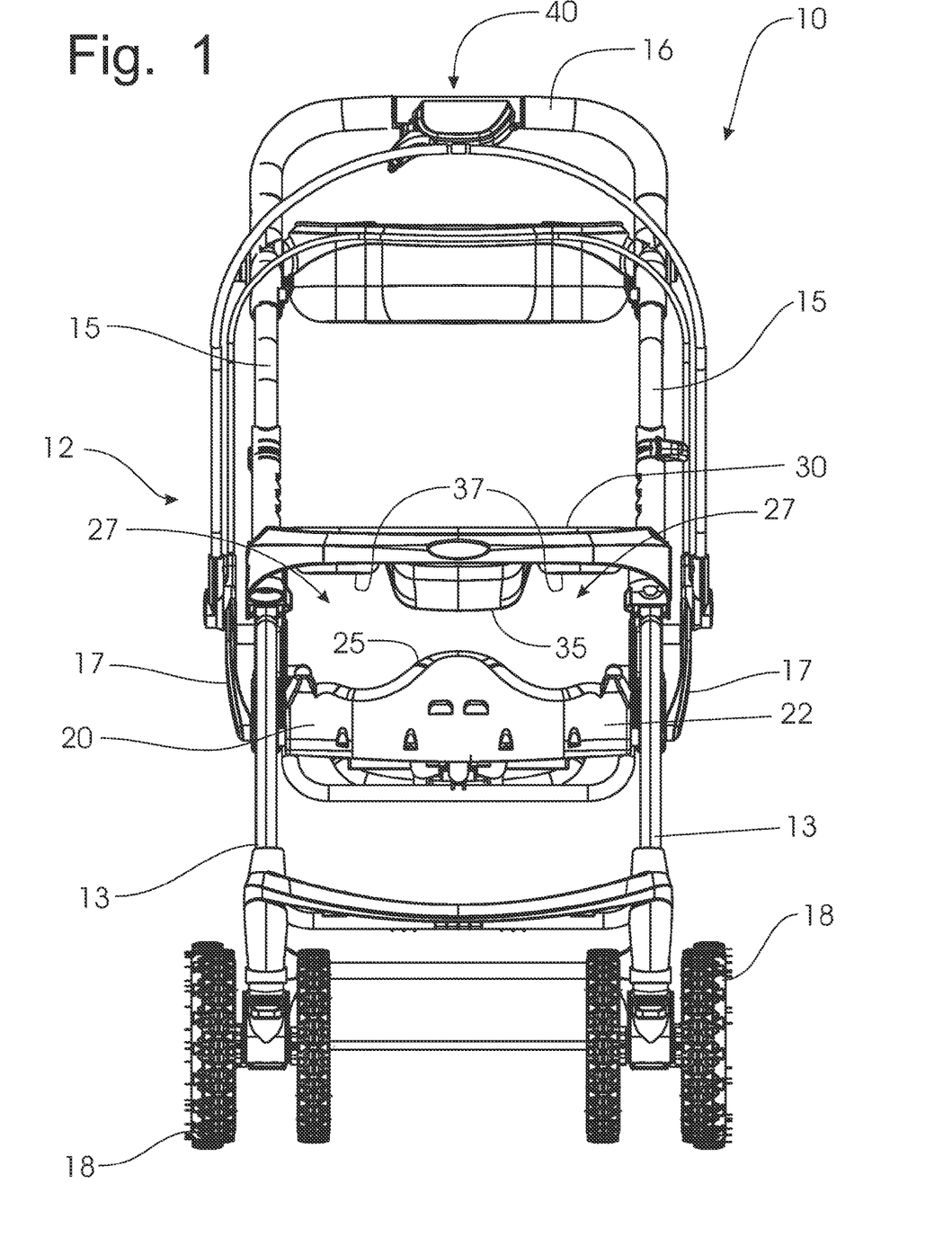
FIG. 1 is a front elevational view of a stroller incorporating the principles of the instant invention, the conventional fabric portions of the stroller forming the seat cushion, hood and other non-frame components of the stroller being removed for purposes of clarity.
Figure 2:
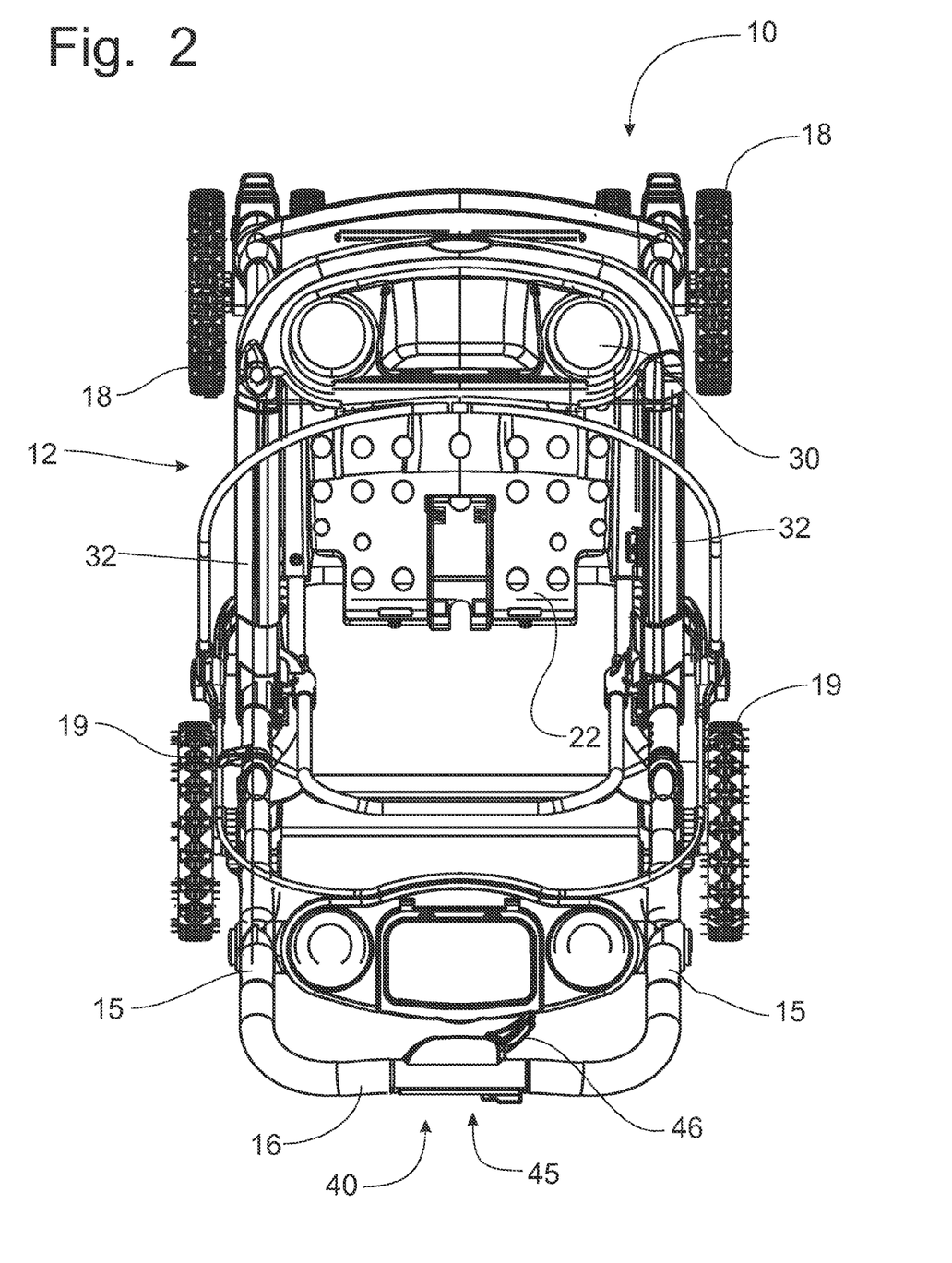
FIG. 2 is a top plan view of the stroller shown in FIG. 1.

A latch mechanism 40 is mounted in the handle tubes 15 and includes an actuation mechanism 45, preferably formed with a trigger-like actuation lever 46, supported at the center of the handle bar 16 to operate retractable latch members housed within the handle tubes 15 to lock into the rear legs 14 and fix the articulation of the handle tubes 15 with respect to the corresponding stabilization members 17 in an upright orientation. The retraction of the latch members allows an articulation of the handle tubes 15 relative to the stabilization members 17 to accomplish a folding of the stroller frame 12 into the compact storage configuration.

Figure 3:
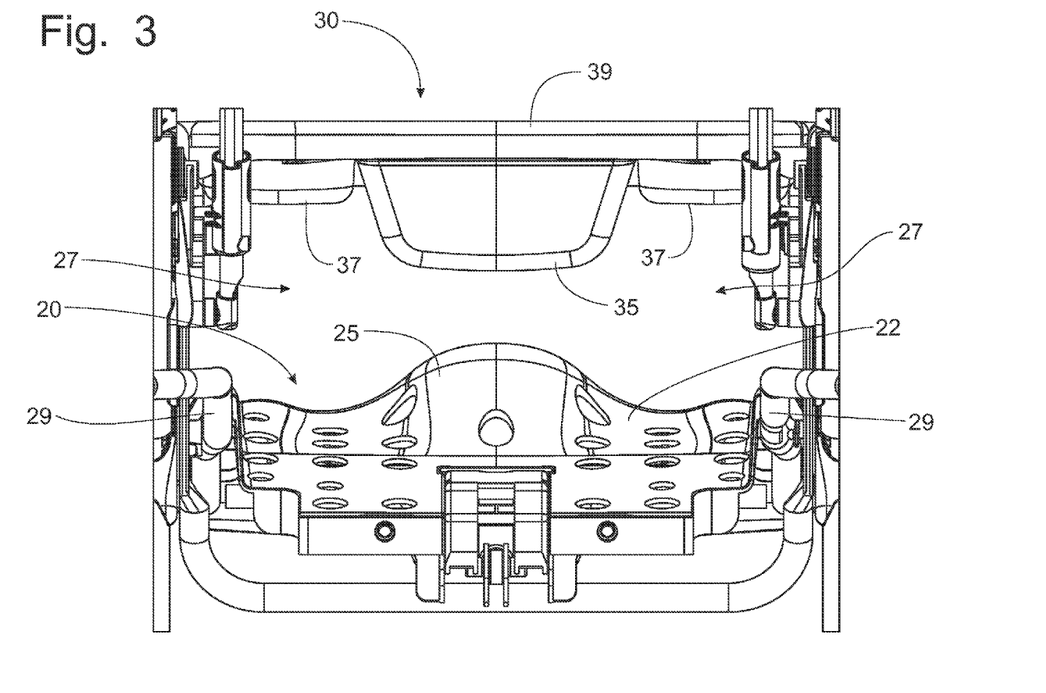
FIG. 3 is an enlarged rear elevational view of the split occupant retention structure on the stroller depicted in FIG. 1.
Figure 4:
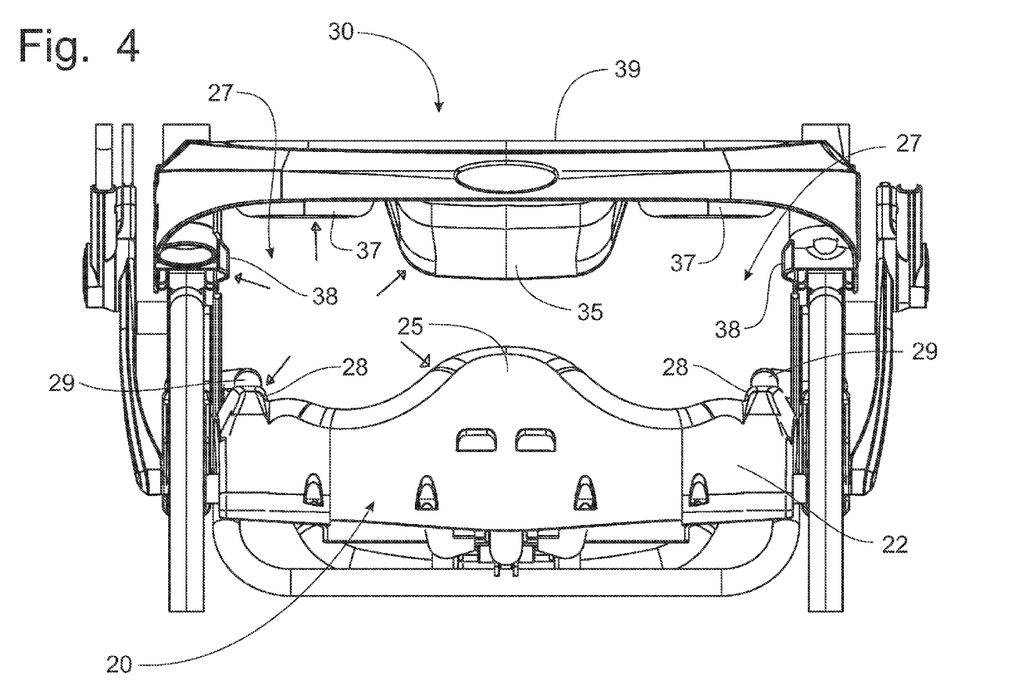
FIG. 4 is an enlarged front elevational view of the split occupant retention structure on the stroller depicted in FIG. 1.

The seat assembly 20 is formed with a seat pan 22 that has an abbreviated lower horn 25 projecting upwardly from the seat pan 22 toward the tray 39. On opposing sides of the lower horn 25 are leg openings 27 that allow the passage of the legs of a child occupant positioned on the seat pan 22. To the outside of the leg openings 27, the seat pan 22 is further formed with raised mounting structures 28 into which rearwardly extending seat tubes 29 are mounted to provide support for a rearwardly positioned basket structure (not shown). As is best seen in FIGS. 3 and 4, the raised mounting structure 28 for the seat tubes 29 provides protuberances on the outside periphery of the seat pan 22 that projects above the surface of the leg openings 27, though not as high as the abbreviated lower horn 25.

The arm rest and tray assembly 30 is formed with a pair of transversely spaced arm rests 32 interconnected at the forward ends thereof by a tray 39 that is pivotally connected to one of the arm rests 32 and latched to the opposing arm rest 32, as will be described in greater detail below, such that the tray 39 can be disconnected from the latched arm rest 32 and pivoted about the other arm rest 32 to permit access into the seat assembly 20 onto which a child can be seated. The underside of the tray 39 is formed with an abbreviated upper horn 35 that extends downwardly toward the lower horn with which the upper horn is aligned, but spaced vertically therefrom. Furthermore, the underside of the tray is formed with a pair of upper protuberances 37 positioned on opposing sides of the upper horn 35. Each upper protuberance 37 extends downwardly from the tray 39, though not as far as the central upper horn 35. Preferably, the tray 39 is also formed with a pair of small side protuberances 38 located generally diagonally opposite the lower horn 25 with respect to the leg opening 27.

Figure 5:
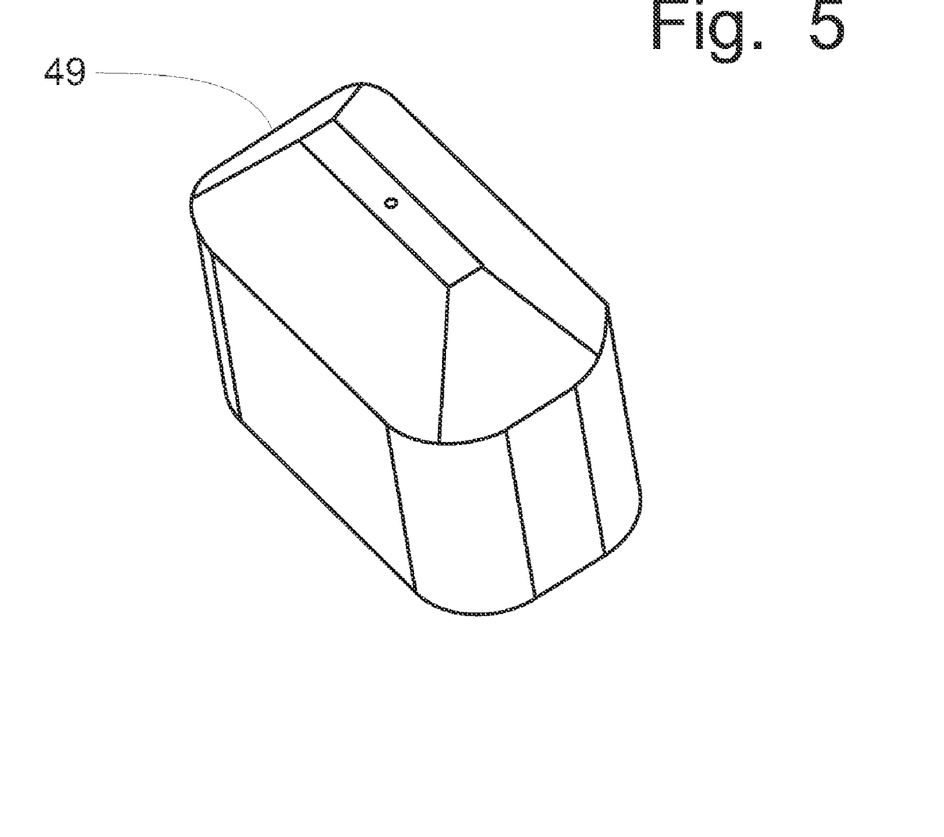
FIG. 5 is a perspective view of a small probe used to determine if an occupant retention apparatus is successful.
Figure 6:
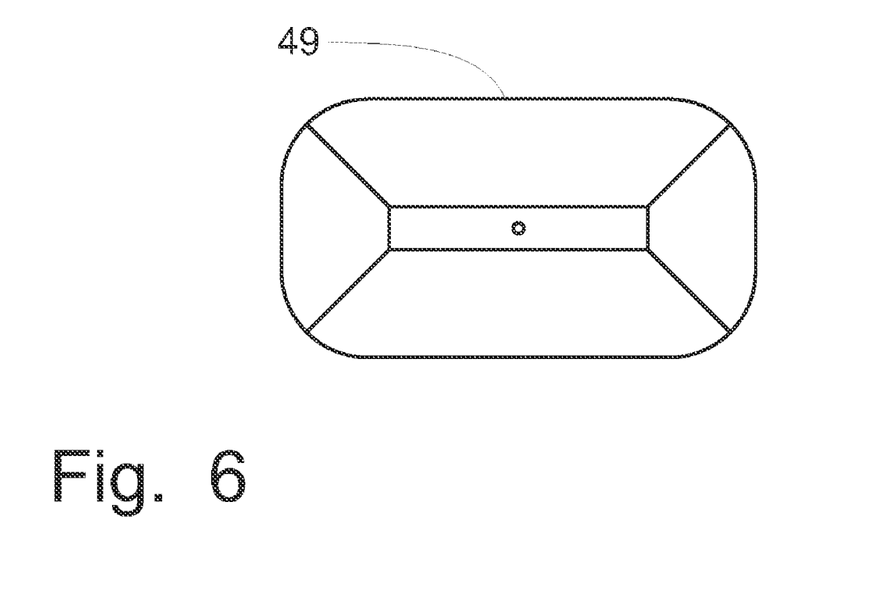
FIG. 6 is a top plan view of the small probe shown in FIG. 5.

The small probe 49, used as a standard to determine the ability of an opening to restrict the passage of the torso of a child occupying the stroller on the seat pan 22, is depicted in FIGS. 5 and 6. As can be seen in FIG. 6 the upper end of the test probe 49 defines a generally rectangular block that, if capable of passing through an opening, renders unsuccessful the test for the opening being able to retain the child's torso. While scale of the test probe 49 in FIGS. 5 and 6 is not intended to correspond to the scale of the leg openings 27 depicted in any of FIGS. 1-4, the size of the diagonal dimension extending between the side protuberance 38 and the side of the lower horn 25, as well as the size of the diagonal dimension between the side of the upper horn 35 and the raised mounting structure 28 on the periphery of the seat pan 22, is not sufficient to allow the test probe 49 to pass through the leg opening 27. Similarly, the height of the leg opening 27 measured between the upper protuberance 37 and the seat pan 22 is not sufficient for the passage of the test probe 49. Furthermore, the vertical height between the corresponding sides of the lower and upper horns 25, 35 won't permit the passage of the height of the test probe being passed horizontally through the leg openings 27.

Since the lower and upper horns 25, 35 are not connected, and further are spaced a significant distance apart, the movement of the arm rest and tray assembly 30 relative to the seat assembly 20 during the pivotal movement of the frame 12, when converting between the operative and storage configurations, is not restricted, as would be found if the lower and upper horns 25, 35 were connected to provide a solid vertical barrier, or even if the lower and upper horns 25, 35 were sufficiently close together to interfere.

Figure 7:
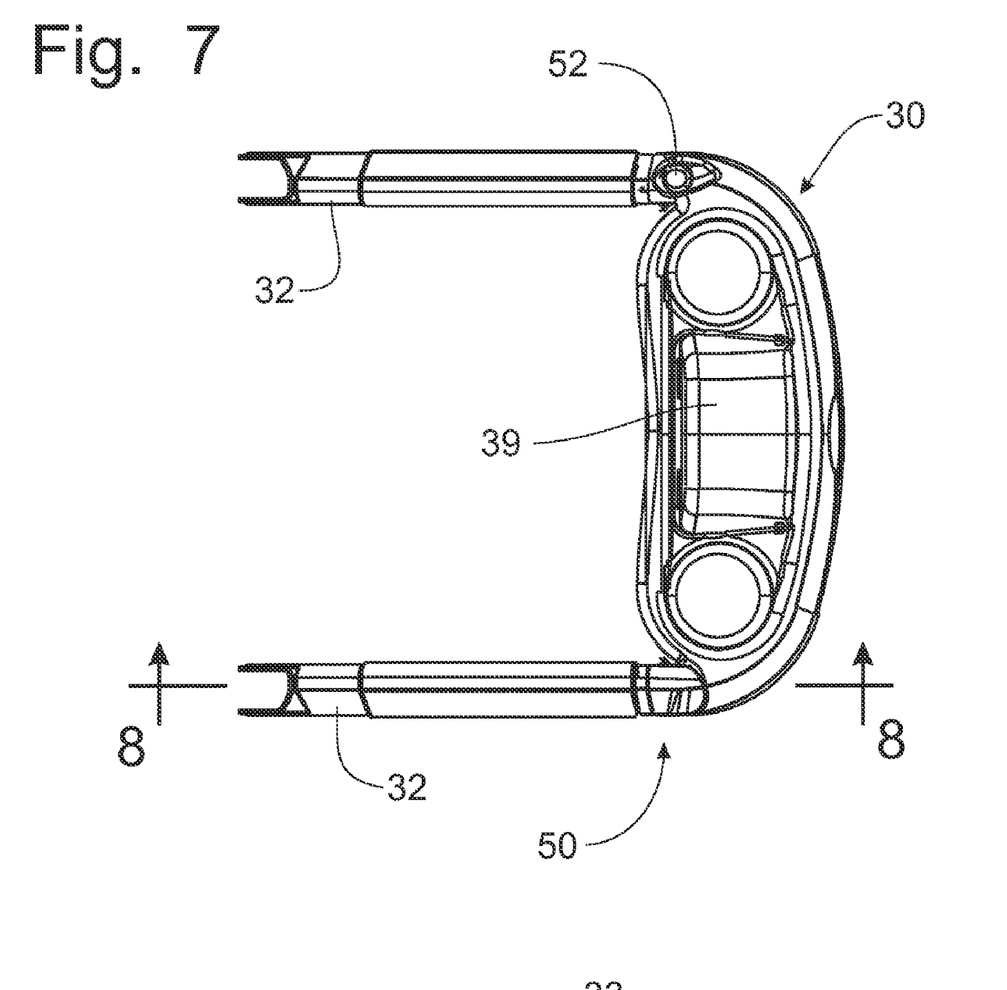
FIG. 7 is an enlarged top plan view of the tray and arm rest assembly depicted on the stroller shown in FIG. 1.
Figure 8:
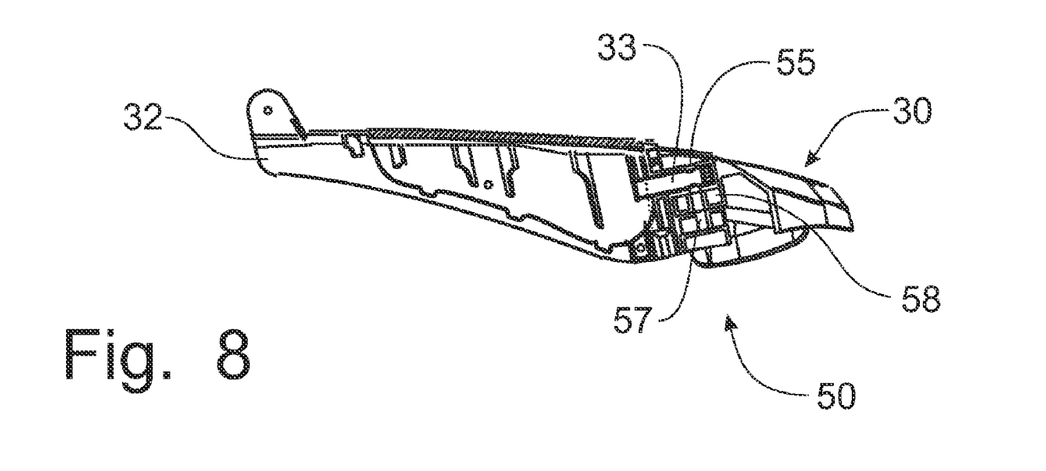
FIG. 8 is a cross-sectional view of the right arm rest corresponding to lines 8-8 of FIG. 7 to show the swivel mounting device for the tray.

The mounting of the tray 39 to the arm rests 32 is best seen in FIGS. 7 and 8. While the reference below to the left and right arm rests 32 are used as a matter of reference, as depicted in the drawings, one skilled in the art will recognize that the mounting connections of the tray 39 described below could also be reversed so that the tray opens oppositely to that shown in the drawings. The tray 39 is pivotally connected to the right arm rest 32 and latched to the left arm rest 32. The latch mechanism 52 is a conventional button-release latch mechanism that uses a spring-loaded catch which is manipulated through a depressible button 53 to release the tray 39 from the left arm rest 32.

Once released from the left arm rest 32, the tray 39 is free to pivot about the connection with the right arm rest 32. The right arm rest 32 is formed with a forwardly projecting mounting pin 33 having a pivot pin 57 inserted through the forward end thereof. The tray 39 carries a bearing 58 to permit rotation of the tray 39 about the pivot pin 57 independently or in conjunction with the pivotal movement of the tray 39 about the mounting pin 33. With this arrangement, the tray 39 can pivot generally horizontally about the axis of rotation defined by the pivot pin 57, or generally vertically about the axis of rotation defined by the forwardly extending mounting pin 33. Since the pivot pin 57 rotates with the tray 39 about the axis of rotation defined by the mounting pin 33, the tray 39 remains capable of pivoting about the pivot pin 57 irrespective of the orientation of the pivot pin 57, affecting a swivel movement for the pivoting action of the tray 39. Also, if the tray 39 is to be removed completely from the stroller 10, the latch mechanism 52 is released at the left arm rest 32 and the spring-loaded detent 55 is released at the right arm rest 32 to enable the tray 39 to be lifted off the mounting pin 33.

Figure 9:
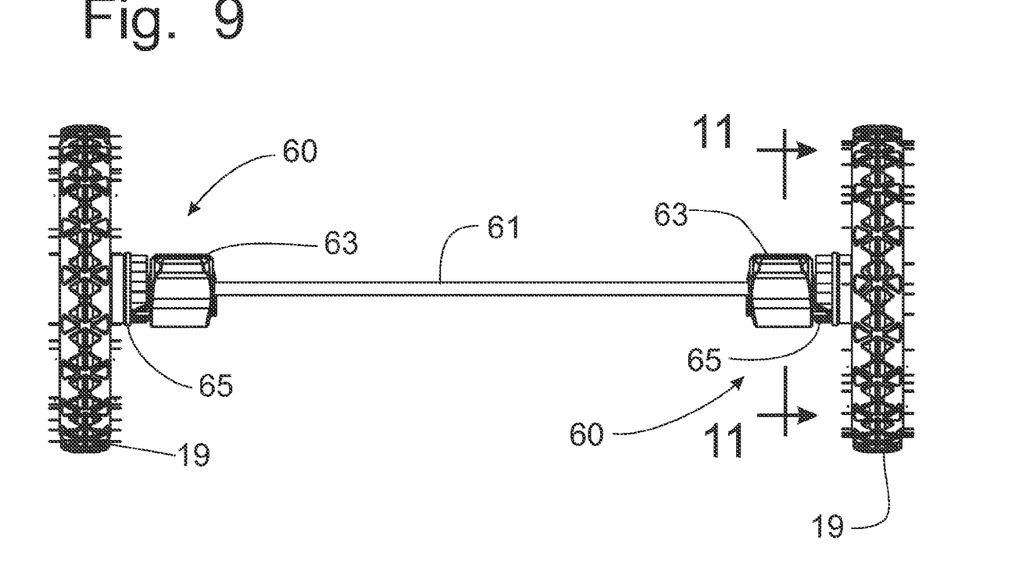
FIG. 9 is an enlarged elevational view of the rear axle of the stroller shown in FIG. 1.
Figure 10:
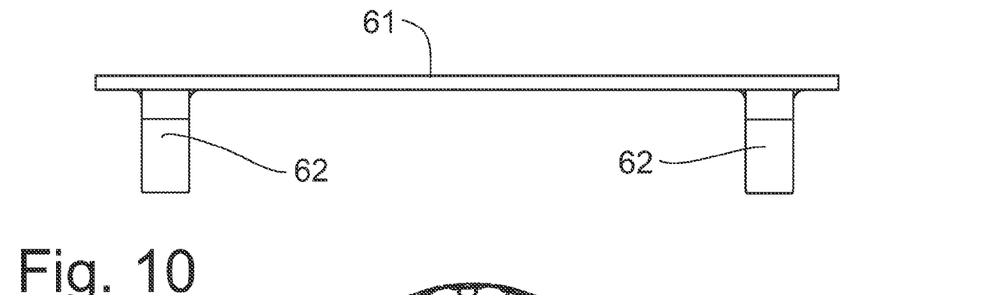
FIG. 10 is a top plan view of the rear axle member.
Figure 11:
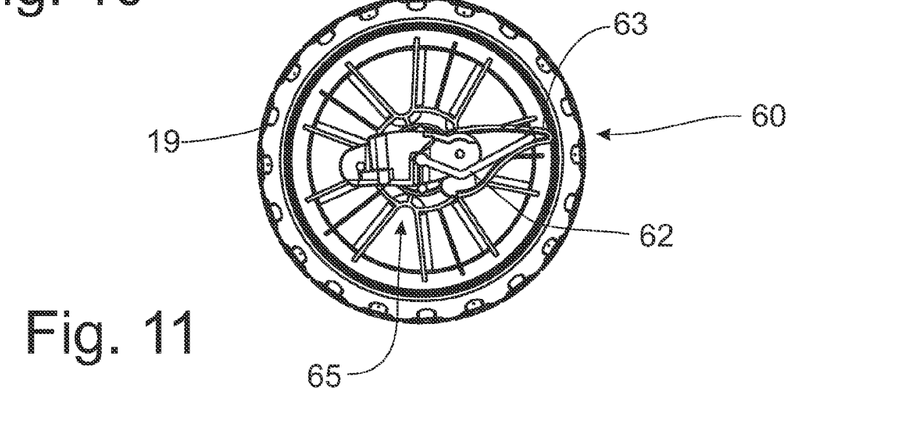
FIG. 11 is a cross-sectional view through the brake actuation lever corresponding to lines 11-11 of FIG. 9.

Referring now to FIGS. 9-11, the details of the brake actuation mechanism 60 can best be seen. The rear axle 61 rotatably supports each of the rear wheels 19 at the transversely opposing ends thereof such that the rear axle 61 itself does not rotate. Near each transversely opposing end of the rear axle 61 a rearwardly extending tab 62 is welded to the axle 61. The brake actuation mechanism 60 includes a pair of laterally spaced actuation levers 63 that are connected directly to the brake mechanism 65 operatively associated with each respective rear wheel 19. The axle tabs 62 are positioned to be housed inside of the brake actuation levers 63, as is best seen in FIG. 11, such that pressing down on one of the actuation levers 63 to lock the brake mechanism 65 on the corresponding rear wheel 19 causes the rearwardly extending axle tab 62 to rotate downwardly with the actuation lever 63.

Since the axle tab 62 is welded to the rear axle 61, the downward movement of the first axle tab 62 causes a corresponding downward movement of the opposing axle tab 62, which is housed inside the other brake actuation lever 63 and causes the brake mechanism 65 on the opposing rear wheel 19 to also lock the rotation of the rear wheel 19. Consequently, the manipulation of either of the brake actuation levers 63 causes both brake actuation levers 63 to engage the brake mechanism 65 on both rear wheels 19 and lock the rotation of the rear wheels 19 until either of the brake actuation levers 63 are raised to release the brake mechanism 65. The interconnection of the opposing rear wheel brake mechanisms 65 is, thus, accomplished through the rotation of the rear axle 61 in response to the movement of the rearwardly extending axle tabs 62 without the need for additional cross bars, links and other related components to provide simultaneous brake actuation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A stroller for transporting a child comprising:
   a frame having front legs and rear legs terminating in corresponding front and rear ground engaging wheels, and a handle assembly extending upwardly to terminate in a grip portion;
   a seat assembly mounted on said frame, said seat assembly including a seat pan on which the child can be seated, said seat pan being formed with a centrally positioned, abbreviated lower horn extending upwardly from said seat pan;
   a tray supported on said frame above said seat assembly, said tray including a centrally positioned, abbreviated upper horn extending downwardly from said tray in general alignment with said lower horn, said seat assembly and said tray defining laterally spaced leg openings on opposing sides of said upper and lower horns; and
   a pair of upper protuberances extending downwardly from said tray on opposing sides of said upper horn and located generally along a forward peripheral edge of said seat pan, each of said upper protuberances having a rounded shape and being positioned between said upper horn and a corresponding side of said tray, each of said upper protuberances having a vertical dimension less than said upper horn for limiting a vertical height dimension of said leg openings such that a standard ASTM test probe cannot pass through either of said leg openings.

2. The stroller of claim 1 wherein said seat pan is also formed with a lower protuberance at said peripheral edge on either side of said lower horn which cooperates with said upper horn to limit a diagonal dimension of said leg opening extending between said upper horn and the corresponding said lower protuberance to prevent said test probe from passing through said leg opening.

3. The stroller of claim 2 wherein said tray is also formed with a side protuberance outboard of each respective upper protuberance, each said side protuberance cooperating with said lower horn to limit a diagonal dimension of said leg opening extending between said lower horn and the corresponding said side protuberance to prevent said test probe from passing through said leg opening.

4. The stroller of claim 3 wherein each of said side protuberances and each of said lower protuberances have a depth dimension extending into said leg opening that is less than said vertical height dimension of said upper horn.

5. The stroller of claim 3 further comprising a pair of laterally spaced arm rests supported on said frame, said tray being mounted on said arm rests by a latch mechanism corresponding to one of said arm rests and a pivot mechanism corresponding to the other of said arm rests, said pivot mechanism permitting said tray to pivot about two orthogonally extending pivot axes.

6. The stroller of claim 3 wherein said upper horn terminates in a vertically spaced relationship with respect to said lower horn.

7. A stroller for transporting a child, comprising:
   a frame;
   a seat assembly supported from said frame, said seat assembly including a seat pan on which the child can be seated, said seat pan being formed with a first centrally located protrusion extending upwardly from said seat pan, said seat pan including a forward peripheral edge;
   a transversely extending member supported from frame above said seat assembly, said transversely extending member having a second protrusion extending downwardly therefrom and terminating in a spaced relationship to and in alignment with said first protrusion;
   a pair of upper protuberances extending downwardly from said transversely extending member located generally along said forward peripheral edge of said seat pan on opposing sides of said second protrusion, each said upper protuberance having a rounded shape and being positioned between said second protrusion and a corresponding side of said transversely extending member;
   a lower protuberance located on said seat pan at said forward peripheral edge on opposing sides of said first protrusion; and
   said seat pan and said transversely extending member defining a leg opening located on opposing sides of said first and second protrusions for the passage of a leg of the child while seated on said seat pan, said first and second protrusions preventing the torso of the child from passing between said seat pan and said transversely extending member, said upper protuberances limiting a vertical height dimension of said leg openings such that said test probe cannot pass through said leg openings, said lower protuberances cooperating with said second protrusion to limit a diagonal dimension of said leg opening extending between said second protrusion and the corresponding said lower protuberance.

8. The stroller claim 7 wherein said transversely extending member is a tray formed with a side protuberance at a laterally spaced periphery on either side of said second protrusion, each said side protuberance cooperating with said first protrusion to limit a diagonal dimension of each said leg opening extending between said first protrusion and the corresponding said side protuberance to prevent said standard ASTM test probe from passing through said leg openings.

9. The stroller of claim 8 wherein said upper protuberances have a vertical height extending downwardly from said tray that is less than a corresponding vertical height of said second protrusion.

10. A stroller for transporting a child comprising:
    a frame having front legs and rear legs terminating in corresponding front and rear ground engaging wheels, and a handle assembly extending upwardly to terminate in a grip portion, said front legs, said rear legs and said handle assembly being pivotally interconnected to permit said frame to move between an expanded operative configuration and a compact folded configuration;
    a seat assembly mounted on said frame, said seat assembly including a seat pan on which the child can be seated, said seat pan being formed with a centrally positioned lower protrusion extending upwardly from said seat pan; and
    an arm rest and tray assembly mounted on said frame above said seat assembly, said arm rest and tray assembly including a pair of laterally spaced arm rests that are interconnected at forward ends thereof by a transversely extending tray, said tray including a centrally positioned upper protrusion extending downwardly from said tray in general alignment with said lower protrusion, said seat assembly and said arm rest and tray assembly defining laterally spaced leg openings on opposing sides of said upper and lower protrusions for the passage of a leg of the child seated on said seat pan, said upper and lower protrusions preventing the child's torso from passing between said seat pan and said tray, said arm rest and tray assembly incorporates a pivot mechanism pivotally mounting said tray to one of said arm rests, said pivot mechanism permitting said tray to pivot about two orthogonally extending pivot axes, said tray being detachable connected to said other arm rest by a latch mechanism, said pivot mechanism including:

a mounting pin extending forwardly from said other arm rest;

a spring-loaded detent carried by said tray to engage said mounting pin for detachably mounting said tray on said mounting pin, said detent permitting said tray to pivot about said mounting pin; and a pivot pin oriented generally perpendicularly to said mounting pin, said tray being pivotable about said pivot pin independently of said pivotal movement of said tray about said mounting pin, such that said tray is capable of simultaneous pivotal movement about two orthogonally extending pivot axes.

11. The stroller of claim 10 wherein said mounting pin is formed with a reduced diameter neck against which said spring-loaded detent is engaged.

12. The stroller of claim 10 wherein said upper and lower protrusions are abbreviated and terminate in a vertically spaced relationship.

13. The stroller of claim 12 wherein said leg openings are limited in size by said seat assembly and by said arm rest and tray assembly, including said upper and lower protrusions, to prevent the passage of a standard ASTM test probe from passing through said leg openings.

14. The stroller of claim 13 wherein said tray is also formed with a pair of upper protuberances extending downwardly on opposing sides of said upper protrusion, said upper protuberances having a vertical height extending downwardly from said tray that is less than a corresponding vertical height of said abbreviated upper protrusion, said upper protuberances limiting a vertical height dimension of said leg openings such that said test probe cannot pass through said leg openings.

15. The stroller of claim 14 wherein said seat pan is also formed with a lower protuberance located at a laterally spaced periphery of said seat pan on both sides of said lower protrusion to cooperate with said upper protrusion to limit a diagonal dimension of said leg opening extending between said upper protrusion and the corresponding said lower protuberance to prevent said test probe from passing through said leg opening, said tray also being formed with a side protuberance outboard of each respective upper protuberance, each said side protuberance cooperating with said lower protrusion to limit a diagonal dimension of said leg opening extending between said lower protrusion and the corresponding said side protuberance to prevent said test probe from passing through said leg opening.

* * * * *